United States Patent [19]

Daigo

[11] 4,451,854
[45] May 29, 1984

[54] PICTURE INFORMATION INPUT APPARATUS

[75] Inventor: Junichi Daigo, Nagareyama, Japan

[73] Assignee: Tokyo Shibaura Denki Kabushiki Kaisha, Kawasaki, Japan

[21] Appl. No.: 315,657

[22] Filed: Oct. 27, 1981

[30] Foreign Application Priority Data

Oct. 31, 1980 [JP] Japan .................................. 55-153232
Oct. 31, 1980 [JP] Japan .................................. 55-153251

[51] Int. Cl.³ .............................................. H04N 1/40
[52] U.S. Cl. ......................................... 358/282; 382/9
[58] Field of Search ............... 358/107, 106, 282, 280; 356/237; 365/515, 516, 517; 382/9

[56] References Cited

U.S. PATENT DOCUMENTS 4,114,028 9/1978 Baio et al. .
4,327,375 4/1982 Leclerc ................................ 358/107

FOREIGN PATENT DOCUMENTS 1121863 8/1962 Fed. Rep. of Germany .
1210601 8/1966 Fed. Rep. of Germany .

Primary Examiner—Tommy P. Chin
Assistant Examiner—Edward L. Coles
Attorney, Agent, or Firm—Cushman, Darby & Cushman

[57] ABSTRACT

A picture information input apparatus has a leading and trailing end detecting circuit for detecting the leading and trailing ends of a document to produce read out signals of "1" and "0". The leading and trailing end detecting circuit starts a first count by a document presence detecting signal of "0" from a detecting unit which detects the transfer of the document. When a hole of the document is smaller than an allowable hole diameter, it clears the counting. Only when the hole is larger than the allowable hole diameter, it starts a second count. After the second count ends, it produces a read out signal of "0" indicating that the trailing edge of the document is detected. A picture bus control circuit receives the read out signal of "1" to transmit a picture data signal to a picture transceiver, and receives the read out signal of "0" to stop the transmission of the picture data signal.

4 Claims, 16 Drawing Figures

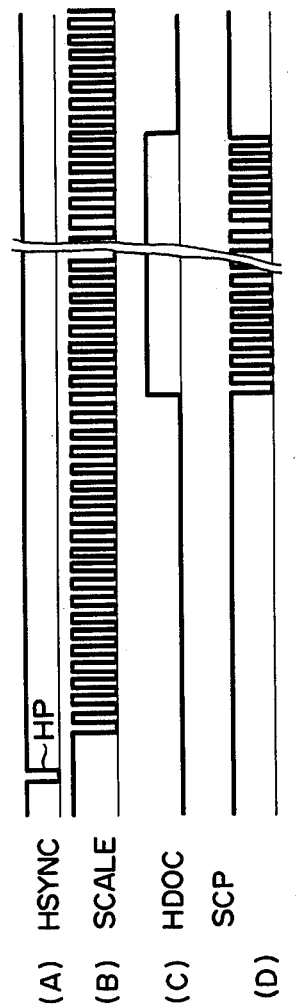
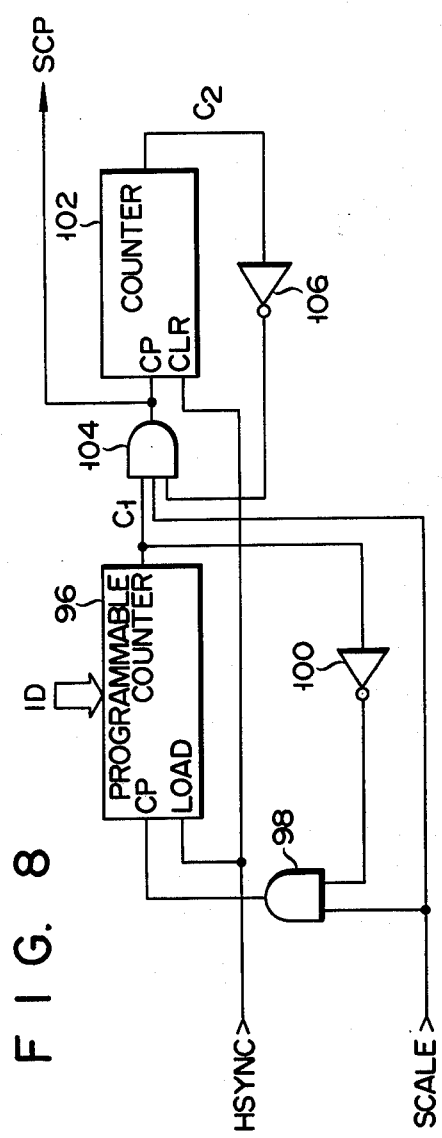
FIG. 7
FIG. 8

PICTURE INFORMATION INPUT APPARATUS

BACKGROUND OF THE INVENTION

The present invention relates to a picture information input apparatus for use in an electronic picture information filing system.

Recently, a picture information filing system has been developed, in which the picture information of an enormous number of documents produced in offices, for example, are photoelectric-converted through a two-dimensional optical scanning in a picture information input apparatus, the photoelectric-converted picture information are stored in a picture storage section with a large memory capacity, and the picture information are retrieved and reproduced, as required, to record or display the picture information in the form of a two-dimensional visual picture. In this type of the picture information input apparatus, a transferring document (an original document) is scanned in the read out section in a direction orthogonal to the document transferring direction, to secure the inputting of the picture information.

For securing a reliable inputting of the picture information, it is necessary to accurately time the start and the end of the read-in of the picture information of a document. A known timing method is that a transparent point detector, provided prior to the document scanning section, detects the presence of a document and a time lapse since the document detection is used for determining the timings of the start and end. When the document has a hole, however, the known timing setting method erroneously operates to fail to have an appropriate read-in of the picture information.

SUMMARY OF THE INVENTION

Accordingly, the object of the present invention is to provide a picture information input apparatus which is capable of correctly reading in the picture information even when the document has a hole, if a diameter of the hole is below an allowable value, and can properly read in the picture information of the next and subsequent documents even if the diameter of the hole exceeds the allowable value.

This object has been attained by a picture information input apparatus which comprises: transfer means for transferring an object to be read out; optical scanning means which optically irradiates the object for scannings and produces a plurality of synchronizing signals in synchronism with the scannings; optical converting means for converting reflected light from the object into electrical signals; A/D converting means for converting an analog signal from the photoelectric converting means into a digital signal; detecting means which detects at least the transfer of the object to produce a signal "1" or "0" representing the object presence or absence; leading and trailing end detecting means which detects the leading end of said object on the basis of the signal from the photoelectric converting means and the synchronizing signals from the optical scanning means to transmit a "1" read out signal, and when the detecting means detects an opening of the object, receives an object presence signal of "0" from the detecting means to start a first counting, when the opening is smaller than an allowable opening diameter of the object, resets the first count to zero, when the opening is larger than the allowable hole diameter, starts a second counting following the end of the first counting, and following the end of the second counting, transmits the read out signal of "0" while at the same time resets the first and second counts to zero; drive means for driving the transfer means in accordance with at least the object presence signal from the detecting means and the read out signal from the leading and trailing end detecting means; and picture data transmitting means for transmitting a digital signal from said A/D converting means by the synchronizing signal from the optical scanning means so long as the read signal from the leading and trailing end detecting means is "1".

In the picture information input apparatus, when a hole of the object (a document to be read out) is within an allowable hole diameter, the object can be read in as the picture information of one page. Further, even when the hole diameter is larger than the allowable hole diameter, the input apparatus continues the transfer of the object until the read in of the object ends, while producing the picture information, and then stops the transfer of the document. Therefore, an appropriate read in of the picture information can be performed from the next object.

BRIEF DESCRIPTION OF THE DRAWINGS

By way of example and to make the description clearer, reference is made to the accompanying drawings, in which:

FIGS. 7(A) to 7(D) are timing charts useful in explaining the operations of the horizontal synchronizing signal generating section and a main scanning document's trailing end adjusting circuit shown in FIG. 4;

FIG. 8 is a circuit diagram of the main scanning document's trailing end adjusting circuit shown in FIG. 4;

DETAILED DESCRIPTION OF THE PREFERRED EMBODIMENT

Figure 1:
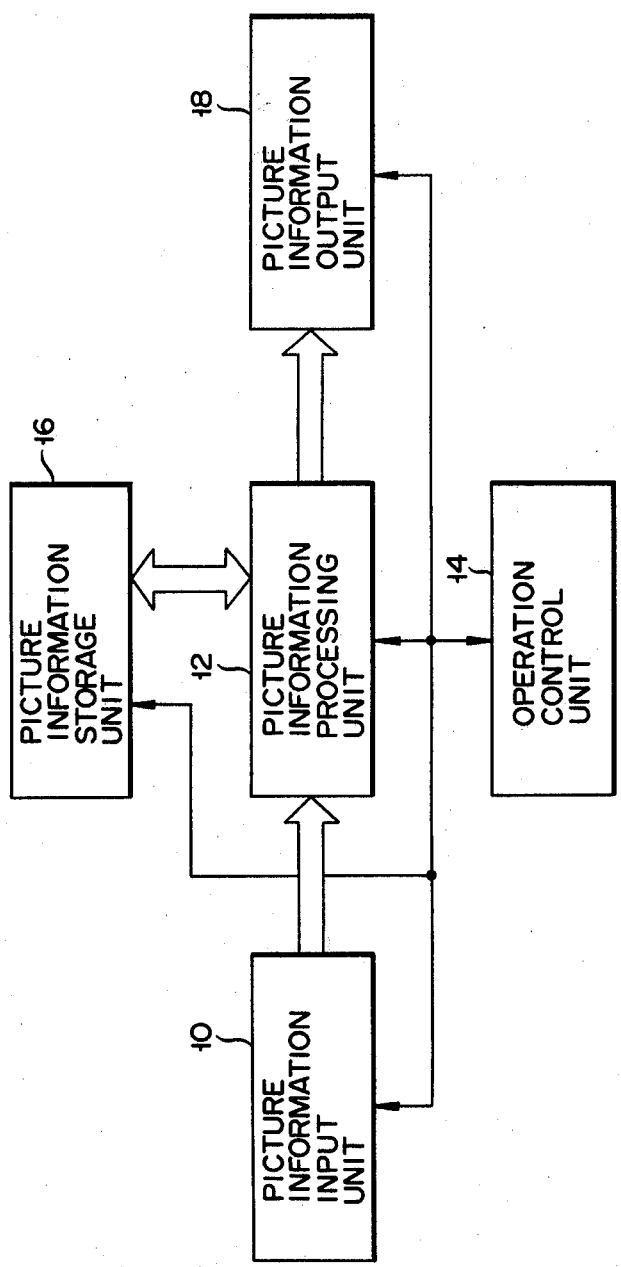
FIG. 1 is a block diagram of a general arrangement of a prior art picture information filing system.

Referring to FIG. 1, there is shown in block form a scheme of a prior picture information filing system to which a picture information input apparatus according to the present invention is applied.

In a picture information input apparatus 10 according to the present invention, the picture information such as documents and manuscripts are photoelectric-converted by a two-dimensional optical scanning. The picture information photoelectric-converted are image-processed in an image processing unit 12. The picture information image-processed are supplied to a picture information storage unit 16 or a picture information output unit 18 under control of an operation control unit 14. The operation control unit 14 controls the overall picture information filing system. Under control of the operation control unit 14, the picture information are stored in the picture information storage unit 16 and, if necessary, are retrieved and supplied to the output unit 18.

Figure 2:
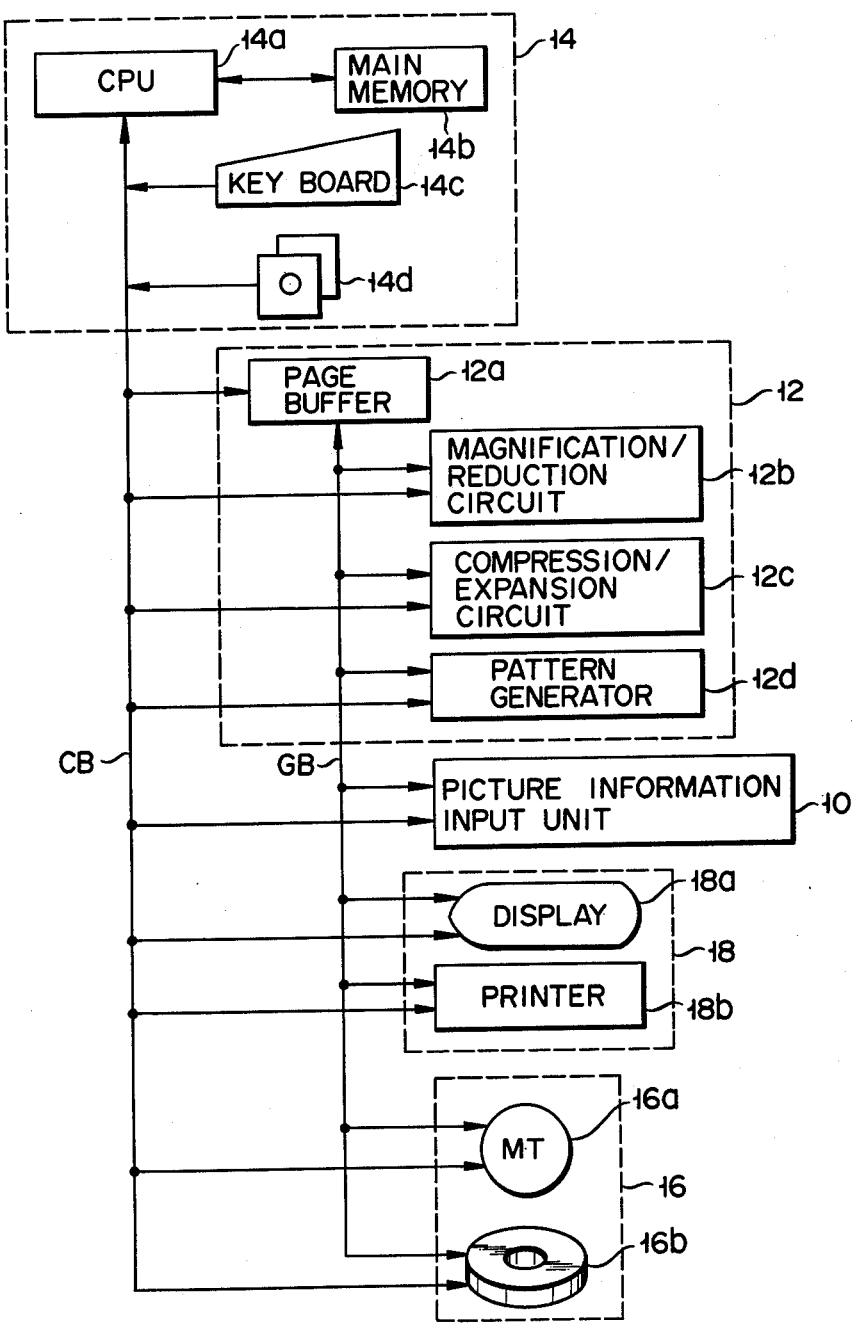
FIG. 2 is a block diagram of a detailed arrangement of the filing system shown in FIG. 1.

FIG. 2 is a more detailed block diagram of the picture information filing system. The image information input unit 10 is comprised of a drive section for transferring documents and a read out section (photoelectric converting section) for reading out the document picture information through an optical scanning. The input unit 10 supplies the photoelectric converted picture information onto an image bus GB. The picture information photoelectric-converted is supplied to an image processing unit 12, through the image bus GB. The image processing unit 12 is comprised of a page buffer 12a with a memory capacity of one page picture information of an A4 size document in the form of a bit image, a magnification/reduction circuit 12b for properly magnifying or reducing the picture information when the information is stored in the page buffer 12a or outputted to the picture output unit 18, an expansion/compression circuit 12c for compressing the picture information when the information is stored into the picture image storage unit 16 and for expanding the picture information stored into the original picture information when the information is reproduced, and a pattern generator 12d which decodes codes representing characters and symbols to produce a pattern for transmission to the page buffer 12a. The operation control unit 14 is comprised of a central processing unit (CPU) 14a, a main memory 14b, a keyboard 14c for inputting various information in keeping and retrieving the picture information, a floppy disc 14d having a control program or the like stored therein. The control information outputted from the CPU 14a are supplied through a control bus CB to the picture information input unit 10, the picture information processing unit 12, the picture information storage unit 16, and the picture information output unit 18. The picture storage device 16, including a magnetic tape device 16a or an optical disc device 16b, stores the picture information from the page buffer and the retrieval title information as well. The picture information output unit 18, comprised of a picture information display device 18a and a printer 18b, produces the picture information retrieved. The picture information display device 18a also displays a message from the operation control unit 14. Seen the display, the operator keys in by the keyboard 14c necessary information such as the designated size of the document in keeping the picture information and the title information in retrieving the picture information.

Figure 3A:
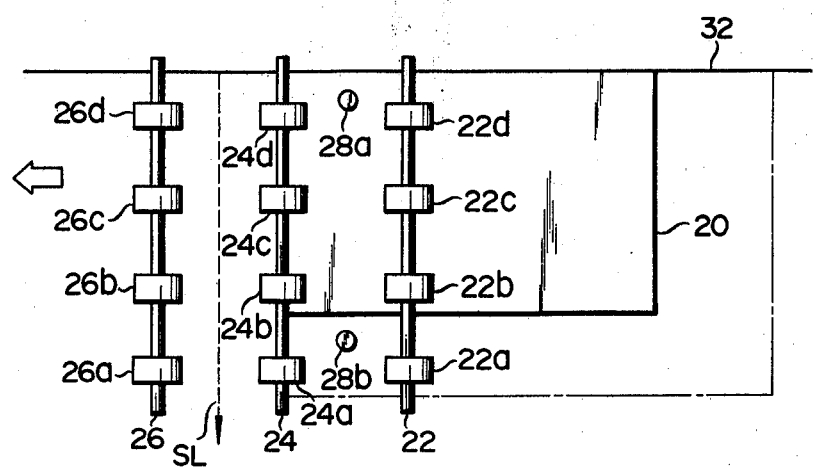
FIGS. 3A and 3B are schematic diagrams of a document transferring section of a picture information input apparatus as an embodiment of the present invention.
Figure 3B:
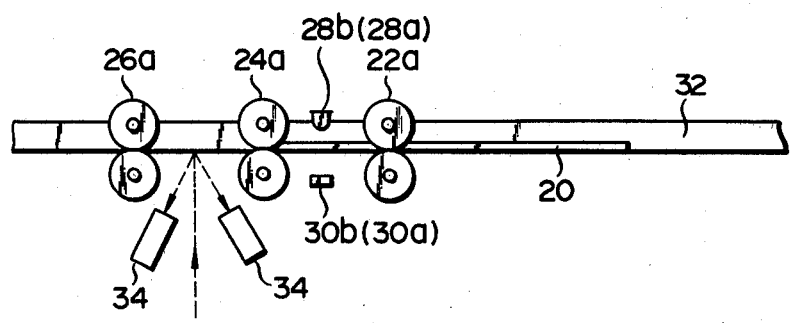

FIGS. 3A and 3B generally show a structure of the document transferring section of the picture information input unit 10. Rotating shafts 22, 24 and 26 are arranged in parallel orthogonal to the transferring direction of the document 20. Each of the rotating shafts 22 to 26 is provided with a plurality of rollers for transferring the document, which are disposed at equidistant intervals; the rollers 22a to 22d for the shaft 22, the rollers 24a to 24d for the shaft 24; the rollers 26a to 26d for the shaft 26. The rotating shafts 22 and 26 are rotated by a motor in an input mode. The rotating shaft 24 may be stopped or started through a clutch operation. Between the rotating shafts 22 and 24 as viewed in the document traveling direction, two pairs of light emission and receiving elements 28a and 30a, and 28b and 30b are provided. The combination of the light emission element 28a and the light receiving element 30a forms a detector for detecting the presence or absence of the document and for checking the document disposed along a reference end 32 of the document. The combination of the light emission element 28b and the light receiving element 30b make up a document size detector for detecting a document size such as A4 and B4. The document reference end 32 is formed of a linear elongation stepped up from the surface of the transfer path. Between the rotating shafts 24 and 26, a portion to be scanned is linearly scanned in a direction normal to the transfer direction. A scanning line SL is indicated by a broken line in FIG. 3A. The reflecting laser beams from the surface of the scanned portion are received by photomultipliers 34 arrayed corresponding to the scanning line SL. The surface of the transfer path at the scanning portion is colored black.

Figure 4:
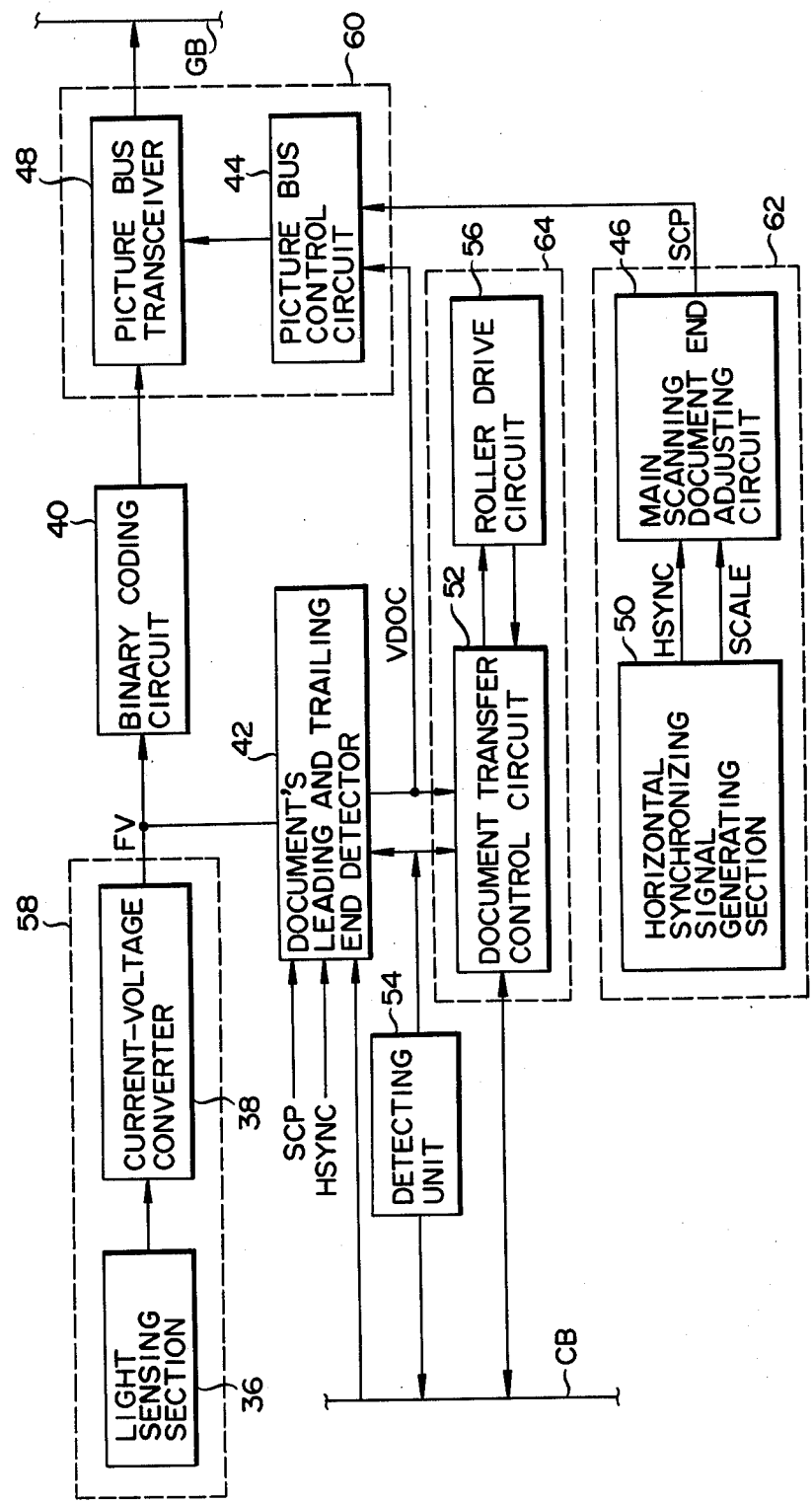
FIG. 4 is a block diagram of an embodiment of a picture information input apparatus according to the present invention.

FIG. 4 shows a schematic block diagram of a picture information input unit 10 according to the present invention. The photomultipliers 34 in the light sensing section 36 produce photomultiplier currents corresponding to an intensity of the reflected laser beams. The photomultiplier currents are gathered and the gathered one is supplied to a current-voltage converter circuit 38 where it is converted into a corresponding voltage. A signal FV representative of the converted voltage is supplied to a binary coding circuit 40 and a document's leading and trailing end detector 42. The binary coding circuit 40 codes the voltage signal FV supplied into binary signals indicative of black and white. The document's leading and trailing end detector 42 detects the leading and trailing ends of the document by using the voltage signal FV or the timer setting time, and sets its output signal VDOC to a "1" level state during an instant that it detects the leading end of the document until it detects the trailing end thereof. The signal VDOC is supplied to a picture bus control circuit 44. The picture bus control circuit 44 is further supplied with a horizontal synchronizing signal SCP from a main scanning document end adjusting circuit 46 to be given later. When the signal VDOC is "1", the picture bus control circuit 44 controls a picture bus transceiver 48 which in turn converts the binary signal from the binary coding circuit 40 into picture element signals for transmission to the picture bus GB. The picture information outputted to the picture bus GB are loaded into the page buffer 12a in response to the horizontal synchronizing signal SCP. The main scanning document end adjusting circuit 46, of which the detail will subsequently be described, serves to adjust the horizontal synchronizing signal in the scanning direction of the laser beam and produces the adjusted horizontal synchronizing signal SCP. The main scanning document end adjusting circuit 46 is supplied with a signal SCALE and a signal HSYNC produced from a horizontal synchronizing signal generating section 50 to be described later, these signals being used for forming the main scanning synchronizing signal.

The signal VDOC outputted from the document's leading and trailing end detector 42 is also supplied to a document transfer control circuit 52. The document transfer control circuit 52 receives a detected signal from a detecting unit 54 including the document presence detecting portion and the document size detecting portion, the VDOC signal, and a command signal from the CPU 14a supplied through the control bus CB, and supplies to a roller drive circuit 56 a control signal for controlling rotations of the rollers 22a to 22d, 24a to 24d, and 26a to 26d. The roller drive circuit 56 rotates the rollers when receiving the rotation control signal. The document transfer control circuit 52 so controls those rollers that, when the VDOC signal is in "1" level, the rollers 22a to 22d, 24a to 24d and 26a to 26d are rotating, while when the VDOC signal is in "0" level, the rollers 24a to 24d are at standstill.

The light sensing section 36 and the current-voltage converter circuit 38 make up a photoelectric converting means 58. The picture bus control circuit 44 and the picture bus transceiver 48 make up a picture data transmitting means 60. The main scanning document end adjusting circuit 46 and the horizontal synchronizing signal generating section 50 form an optical scanning means 62. The document transfer control circuit 52 and the roller drive circuit 56 form a drive means 64.

Figure 5:
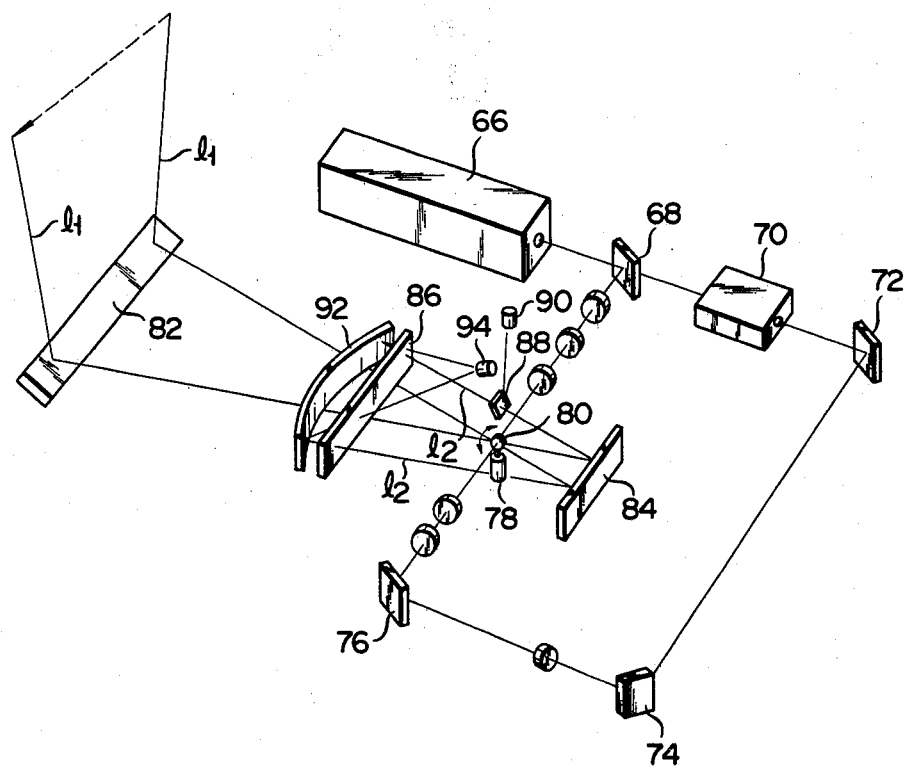
FIG. 5 is a schematic diagram of a horizontal synchronizing signal producing section used in the input apparatus shown in FIG. 4.

FIG. 5 schematically illustrates the construction of the horizontal synchronizing signal generating section 50. A laser beam produced from a laser oscillator 66 is splitted into two beams by a beam splitter 68. One of the splitted beams passes an optical modulator 70 and reflectors 72, 74 and 76, and is led to one side of a reflecting mirror 80 of an optical scanner 78 called a galvanometer. The reflected light beam from the mirror becomes a beam $l_1$ for scanning along the scanning line SL in the portion under scanning shown in FIG. 3A.

Figure 6:
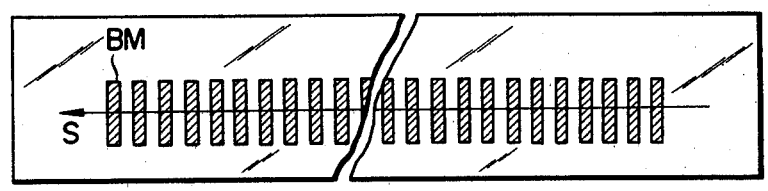
FIG. 6 illustrates an enlarged view of an optical scale used in the section shown in FIG. 5.

The other beam splitted by the beam splitter 68 is led to the other reflecting surface of the reflecting mirror 80 of the optical scanner 78 and then reflected by the reflector 84, serving as a scanning light beam $l_2$ for scanning the optical scale 86 used for generating the horizontal synchronizing signal. The scanning light beam $l_2$ first generated every scanning is reflected by the beam splitter 88 and led to the light receiving element 90 where it is converted into an electrical signal. The electrical signal is converted into a voltage signal, so that the synchronizing signal HSYNC representing a start of one scanning is produced. In the optical scale 86, as shown in FIG. 6, a number of black bar marks BM arranged at fixed intervals are printed on the surface of a strip-like transparent glass plate to form a number of slits. The scanning beam $l_2$ sequentially illuminates the slits on the optical scale 86, as indicated by an arrow S shown in FIG. 6, and the light beams passed through the slits are collected by a concave mirror 92 to be led to the light receiving element 94 where it is transformed into an electrical signal. The electrical signal is converted into a voltage signal to provide the signal SCALE on which the horizontal synchronizing signal SCP in the main scanning is formed. In the present specification, the main scanning is a scanning orthogonal to the document transfer direction. The voltage waveforms of the signal SCALE and the signal HSYNC are illustrated in FIGS. 7(A) and 7(B). A pulse HP representing the start of one scanning appears in the signal HSYNC, then and periodical signals SCALE corresponding to marks, or the slits, printed on the optical scale 86 are produced.

FIG. 8 shows a circuit diagram of a main scanning document's end adjusting circuit 46 shown in FIG. 4. The signal HSYNC is supplied to a load terminal of a programmable counter 96. The counter 96 is loaded with an initial value ID by the pulse HP representing the start of one scanning in the signal HSYNC, and is sequentially counted down by the signal SCALE which is supplied to a clock terminal through an AND circuit 98. And the counter 96 produces an output signal C1 of "1" level representing the stop of counting when the count is 0. The signal C1 is at "1" level during the course of the counting. The output signal C1 is supplied to the AND circuit 98 as a gate signal by way of an inverter 100. The signal HSYNC is supplied to a clear terminal of a counter 102 and the count thereof is cleared by the pulse HP. The counter 104 is sequentially counted up by the signal SCP supplied to the clock terminal of the counter, the signal SCP being masked by the signal SCALE by means of the AND circuit 104. And the counter 102 stops its counting operation when its count reaches "2048" corresponding to the number of input bits as the picture information of a B4 size in the horizontal direction in one scanning in a main scanning direction, and produces a signal C2 of "1" level indicating the stop of the counting operation. The signal C2 is in "0" level during the counting. The output signal C2 of the counter 102 is supplied to the AND circuit 104 as a gate signal through an inverter 106. Further, the output signal C1 of the counter 96 is supplied to the AND circuit 104, as a gate signal.

Figure 9:
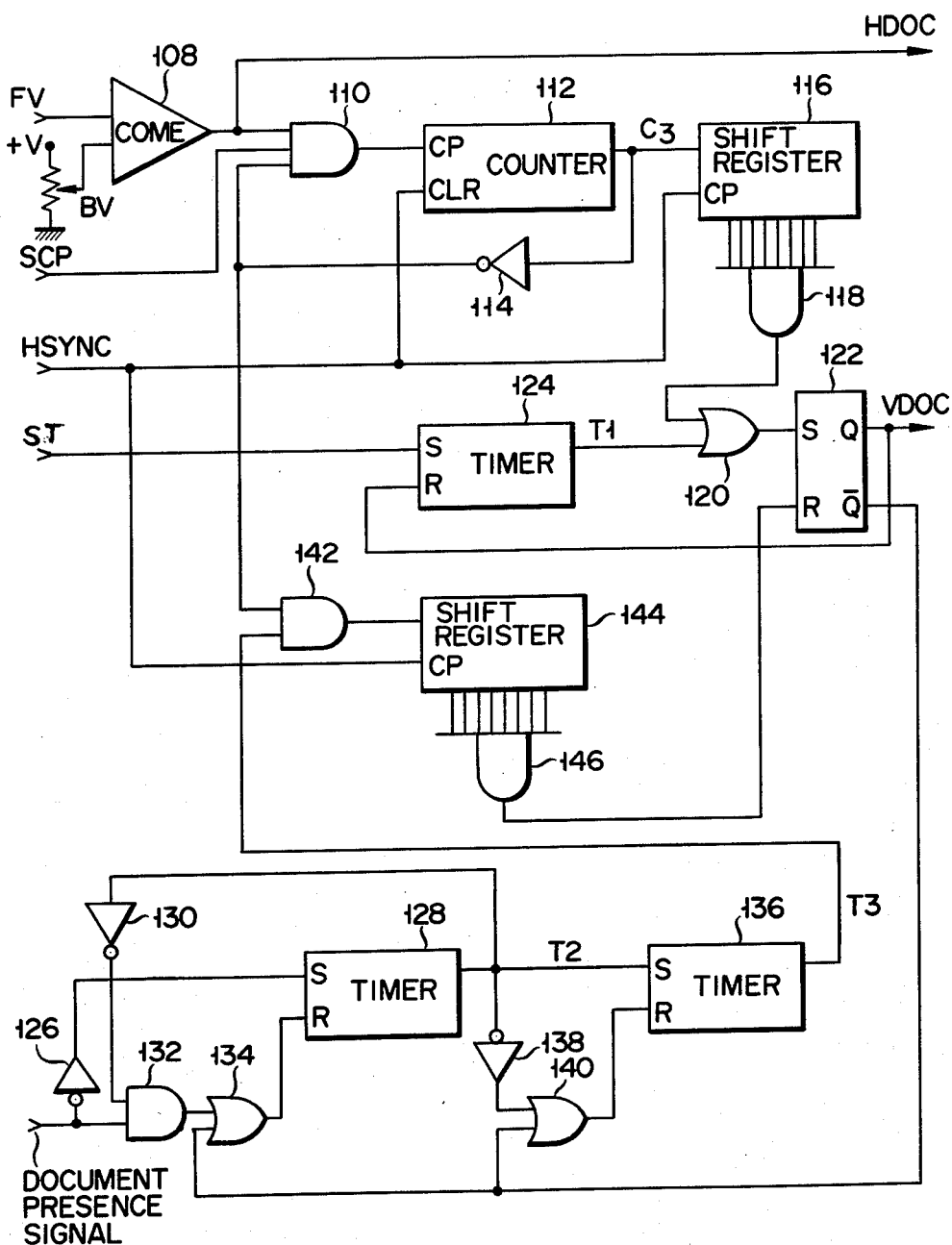
FIG. 9 is a circuit diagram of a document's leading end detecting circuit shown in FIG. 4.

The operation of the main scanning document end adjusting circuit 46 in the above-mentioned arrangement will be described. In response to the pulse HP in the synchronizing signal HSYNC, an initial value ID is loaded into the counter 96. By the pulse HP, the contents of the counter 102 are cleared. The counter 96 starts the count-up operation by the signal SCALE. If the initial value ID is "10", the counter 96 stops its counting when the count reaches "10". At this time, its output signal C1 becomes "1" in level. When the signal C1 is "1", the AND circuit 98 is disabled, while the AND circuit 104 is enabled. Therefore, the signal SCALE, or the signal SCP, through the AND circuit 104 is supplied to the clock terminal of the counter 102, so that the counter 102 starts the count-up operation. The counter 102 continues the count-up operation until it reaches "2048" in its count. At this time, the output signal C2 becomes "1" in level and the AND circuit 104 is disabled, then the counter comes to stop. Thus, the signal SCP masks the signal, as shown in FIG. 7(D). By changing the initial value ID loaded into the programmable counter 96, it is possible to produce a signal SCP with a changed masking position of the signal SCALE. The adjustment of the masking position is performed by changing the value of the initial value ID loaded into the programmable counter 96. For setting the initial value ID, a white document of B4 size is transferred, the light received by the photomultipliers 34 is converted into a voltage signal FV by the current-voltage converting circuit 38, and the voltage signal FV is compared with the reference voltage signal BV by a comparator 108 as shown in FIG. 9. As a result, a signal HDOC which rises during a white width portion in the document over one main scanning. And the initial value ID is set so that the signal SCP is produced at the time of the leading edge of the signal HDOC representing white (corresponding to the reference end of the document), as shown in FIG. 7(C). The initial value ID is set by means of a switch by an operator while observing a waveform of the signal HDOC.

FIG. 9 is a circuit diagram of a document's leading and trailing end detecting circuit 42 shown in FIG. 4. An output signal HDOC of the comparator 108 is supplied to an AND circuit 110 as a gate signal. The AND circuit 110 is supplied with horizontal synchronizing signals SCP to be clock signals of the main scanning. Further, an output signal C3 of a counter 112 is supplied to the AND circuit 110 through an inverter 114, as a gate signal. The output signal of the AND circuit 110 is supplied to a clock terminal of the counter 112. The counter 112 is cleared by a pulse HP indicating the start of one scanning in the signal HSYNC, and is sequentially counted up by an output of the AND circuit 110. The counter 112, when counts "256" corresponding to about 10% of the number of clock pulses "2048" in the signal SCP, produces the output signal C3 at "1" level to stop its counting operation. The output signal C3 of the counter 112 is in 0 level during the counting. The output of the counter 112 is supplied to a data input terminal of a shift register 116, and sequentially shifted by the pulses HP of the signal HSYNC. The shift register 116 has an 8-bit capacity and the 8-bit data output signal is inputted to an AND circuit 118 in parallel. An output signal of the AND circuit 118 is supplied to a set terminal of a flip-flop 122 by way of an OR circuit 120. An output signal of the flip-flop 122 is outputted as the signal VDOC. Further, the signal VDOC is supplied to a reset terminal of a timer 124, and the signal VDOC resets the timer 124 when the signal VDOC is in "1" level. The timer 124 starts counting by a start signal which is supplied from the CPU 14a. The counting operation is continued for a period of a normal time taken for the document to be transferred from the rollers 24a to 24d shown in FIG. 3A to the portion under scanning plus a maximum error time. At the completion of the counting, an output signal T1 of the timer 124 is changed from "0" to "1" level. The output signal T1 of the timer 124 is supplied to a set terminal of the flip-flop 122 through the OR circuit 120.

A document presence detecting signal which is outputted from a document presence detecting section of detecting section 54 is supplied to a count start terminal of a timer 128 through a inverter 126. The timer 128 has a timer set time correspohding to a maximum allowable hole diameter as viewed in the transfer direction when the document has a hole or to a minimum interval between the adjacent documents. The timer 128 starts to count when the output of the inverter 126 is "1" in level, and sets the output signal T2 of the timer 128 to "1" level when counting the setting time. The output signal T2 is supplied to an AND circuit 132 as a gate signal by way of an inverter 130. The document presence detecting signal is supplied to the AND circuit 132, and the output signal of the AND circuit 132 is supplied to a reset terminal of the timer 128 through an OR circuit 134. And the output signal T2 of the timer 128 is applied to a count start terminal of a timer 136. The timer 136 has a set time corresponding to a time when the set time of the timer 128 is subtracted a transfer time from the document detection by the combination of the light emitting and receiving elements 28a and 30a until the document reaches the portion under scanning. The timer 136 sets the output signal T3 of this timer to "1" level when the timer 136 performs clocking operation. Further, the output signal T2 of the timer 128 is inverted by an inverter 138, and is supplied to a reset terminal of the timer 136 through an OR circuit 140. The output signal T3 of the timer 138 is supplied to an AND circuit 142 as a gate signal. A signal as the output signal C3 of the counter 112 inverted by the inverter 114 is supplied to the AND circuit 142, and the output signal of the AND circuit 142 is inputted to a shift register 144. The signal HSYNC is inputted to the clock terminal of the shift register 144, and shift-operates by the pulse HP generated at the start of each main scanning. The shift register 144 has a 8-bit capacity and data output signals of the 8-bit are inputted in parallel to an AND circuit 146. The output signal of the AND circuit 146 is supplied to a reset terminal of the flip-flop 122, and resets the flip-flop 122 when the output signal of the AND circuit 146 is "1" in level, and the output signal of the AND circuit 146 sets the signal VDOC to "0" level, indicating the detection of the trailing end. When the flip-flop 122 is resetted, an inverted output signal of the flip-flop 122 is in "1" level, the timers 128 and 136 are resetted because the inverted output signal is supplied to reset terminals of the timers 128 and 136 by way of the OR circuits 134 and 140.

Figure 10A:
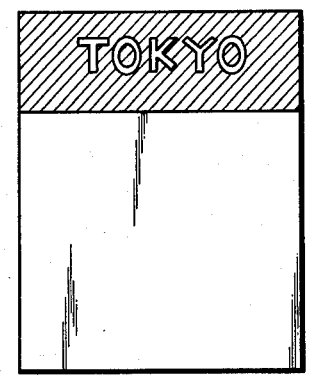
FIGS. 10A, 10B and 10C illustrate documents under to be read in transferred by the document transfer section shown in FIGS. 3A and 3B.

The operation of the document leading and trailing end detecting circuit 42 in the above arrangement will be described. The counter 112 is cleared by the pulse HP in the signal HSYNC. The photomultiplier current produced from the photomultipliers 34 is converted into a voltage signal FV by the current-voltage converting circuit 38. The voltage signal FV is compared with the reference voltage FV in the comparator 108, to judge whether it is white or black. When the output signal from the comparator has a "1" level representing white, the AND circuit 110 is enabled and the counter 112 starts its counting operation in response to the signal SCP. "256" pulses which is about 10% of the number of the clock pulses "2048" in the signal SCP belong to white data, the counter 112 stops its counting operation to set the output signal C3 to a "1" level. A level state of the output signal C3 for each scanning is stored in the shift register 116 by the signal HSYNC over eight scanning lines. When the "1" level of the output of the counter 112 continues over eight scanning lines, the 8 bits outputs of the shift register 116 are all "1" and the output of the AND circuit 118 is at a "1" level, thereby to set the flip-flop 122. Accordingly, the VDOC signal is at "1" level. Thus, when the output signal C3 of the counter 112 is at "1" level, it is judged that the leading end of the document is detected. The reason for this is that erroneous detection by interference noise, for example, must be prevented. This leading end detecting method, however, can not detect the leading end of the document when the leading end portion of the document has only the black information, as shown in FIG. 10A, since in such a case, the leading end portion can not be distinguished from the black surface of the transfer path. It is for this reason that the leading end detection is performed by the timer 124 concurrently with the above-mentioned leading end detection. In the leading end detection, at a time point that the transfer of the document starts by means of the rollers 24a to 24d, the CPU 14a produces a start signal ST. In response to the start signal ST, the timer 124 starts its clocking operation. When the timer clocks (the transfer time)+(maximum error time), it changes a level state of the output signal T1 to a "1" level and sets the flip-flop 122. Accordingly, the signal VDOC becomes at a "1" level, so that the leading end of the document is detected. Accordingly, it is possible to detect the leading end of the document as shown in FIG. 10A.

When the document presence detecting signal outputted from the detector 54 becomes at "0" level representing no detection of the document, the output of the inverter 126 becomes "1" in level and the timer 128 starts the clocking operation. The timer 128 is so designed as to count a set time, that is, the maximum allowable diameter or a length of the minimum interval between the adjacent documents. Before the set time of the timer 128 lapses, the AND circuit 132 is enabled and the timer 128 is resetted when the document presence detecting signal is at "1" level. After the set time of the timer 128 lapses, the output signal T2 becomes "1" in level and the timer 136 starts its time counting operation. Set in the timer is a difference signal obtained by subtracting the set time of the timer 128 from a time taken for the document to travel from the document presence detection to the portion under scanning. After the set time of the timer 136 lapses, the output signal T3 becomes "1" in level to enable the AND circuit 142. Then, levels of signals which are the inverted output signals C3 from the counter 112 every main scanning are sequentially inputted into the shift register 144. When all the output signals of 8 bits of the shift register 144 are all "1", the output of the AND circuit 146 is "1" to reset the flip-flop 122. Accordingly, the signal VDOC becomes "0" in level to indicate the detection of the trailing end. After the set time of the timer 128 lapses, the AND circuit 132 is disabled by the inverter 130 and continues the disabling state. Under this condition, even if the document presence signal is "1", the timer 128 is not reset. That is, the document presence signal is rejected and deemed as void.

Figure 10B:
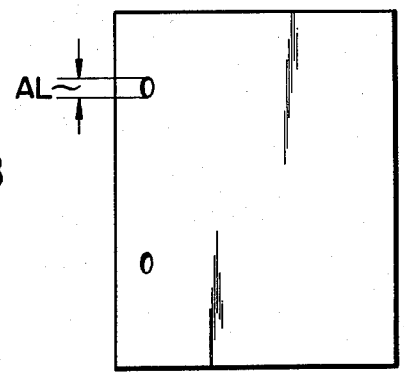
Figure 10C:
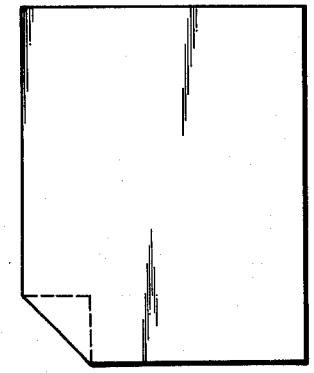

The timer 128 is used for distinguishing a diameter AL of a hole of the document shown in FIG. 10B from a correct transfer interval of the documents. The correct transfer interval of the documents is set larger than the maximum allowable diameter of the hole of the document. Accordingly, after the set time of the timer lapses, the picture information input apparatus deems its operation enters the next document transfer phase, and rejects the document presence signal until the flip-flop 122 is reset. In the present embodiment of the picture information input apparatus, when about ten % of the main scannings over continuous 8 scannings is not white, after the time lapse corresponding to the document transfer time from the document presence detection to the portion under scanning, the input apparatus considers that the trailing end of the document is detected. This is a measure against the folded or soiled trailing end of the document.

The overall operation of the picture information input apparatus as an embodiment of the present invention will be described. Before inputting a document into the input apparatus, an operator keys in by the keyboard 14c the title information for document filing and the designated size information in accordance with an operation procedure displayed by the picture information display unit 18a. Then, the document 20 of A4 size, for example, (in FIG. 3A, one dot chain line indicates a B4 size of the document) is set aligning the document with the document reference end 32 in the document transfer section, as shown in FIGS. 3A and 3B. Following this, the document 20 is transferred by means of the rollers 24a to 24d and the document presence detecting portion and the document size detecting portion detect the presence and the size of the transferring document to produce the document presence signal and document size signal. These two signals are supplied from the detecting unit 54 to the document transfer control circuit 52. After a given lapse of time (from the detection of the document transfer until the document is aligned by the rollers 24a to 24d not rotated) since the document presence signal is supplied, the document transfer control circuit 52 supplies a document standby signal and a document size signal to the CPU 14a, through the control bus CB. During this time, the clutch coupled with the rollers 24a to 24d is still disengaged under the control of the document transfer control circuit 52, and therefore the rollers are at a standstill, so that the leading end of the document is aligned with the rollers. Upon receipt of the document standby signal and the document size signal, the CPU 14a checks whether or not the document size detected coincides with the designated size keyed in from the keyboard 14c. When those are not coincident with each other, "not coincident" is displayed by the display device 18a or sounded by a buzzer. When being aware of this, the operator again keys in the correct designated size of the document. Even when failing to perceive this, if a standard paper size designating key, provided on the keyboard, has been depressed, the CPU 14a ignores the designated size of the document keyed in from the keyboard 14c, controls the magnification/reduction circuit 12b, giving priority to the document transfer control circuit 52, and transfers a start signal to the document transfer control circuit 52.

In response to the start signal, the document transfer control circuit 52 engages the clutch to rotate the rollers 24a to 24d, so that the document aligned by the rollers 24a to 24d which have been stopped starts to travel. When the output signal VDOC of the flip-flop 122 in the document leading and trailing end detecting circuit 42 as described in detail becomes "1" in level (the leading end of the document is detected), the main scanning document end adjusting circuit 46 produces a main scanning synchronizing signal SCP and the picture element information supplied through the binary circuit 40 is outputted through the picture bus transceiver 48 to the picture bus GB. The picture element information outputted to the picture bus GB are loaded into the page buffer 12a, through the sequential count up of the address counter (not shown) by the page buffer 12a by the main scanning synchronizing signal SCP. In this case, even when the designated size keyed in from the keyboard 14c is B4 but the size of the transferred document is A4, the picture information are stored into the page buffer 12a with an A4 size capacity without being reduced by the magnification/reduction circuit 12b since the priority is given to the detected size of the document.

When the signal VDOC is "0" in level, the picture bus control circuit 44 prohibits the outputting of the main scanning synchronizing signal SCP to stop the outputting of the picture element information from the image bus transceiver 48. At the same time, the document transfer control circuit 52, receiving the signal VDOC at "0" level, disengages the clutch coupled with the rollers 24a to 24d to stop their rotation. In this way, the picture information of one page of the document are inputted. Then, the input apparatus waits for the next document transferred. After the completion of scanning the trailing end of the preceding document, the rollers 24a to 24d are rotated for the next document transferred and similar operations are repeated. The picture information stored in the page buffer 12a are information-reduced by the compression/extension circuit 12c, and stored into the picture information storage unit 16, together with the title information. In the present embodiment, the clutch of the rollers 24a to 24d is disengaged just after the trailing end of the document passes the portion under scanning, not just after the transfer time lapses of the document from the document presence detection to the rollers 24a to 24d. The reason for this is that, in the case of the broken document as shown in FIG. 10A, there is a possibility that the rollers 24a to 24d are stopped if the document presence detecting portion is so located, even during the course of the passage of the document on the rollers 24a to 24d. Alternately, the document presence detecting portion, the rollers 24a to 24d, and the portion under scanning are so located that the document transfer time from the rollers 24a to 24d to the portion under scanning is shorter than a period of time from an instant that the document presence detecting portion including the light emitting and receiving elements 28a and 30a until the document reaches the rollers 24a to 24d. Further, the distance from the rollers 24a to 24d to the location of the portion under scanning is smaller than the maximum allowable diameter of the hole. With this arrangement, even when the rollers 24a to 24d are stopped after the trailing end of the document passes the portion under scanning, the next document is aligned by the rollers 24a to 24d.

Explanation to follow is the elaboration of processing erroneous read of document in the picture information filing system with the picture information input apparatus. As in the previous case, a document is set, the document presence detecting portion detects the document, and after a fixed time, the document standby signal is applied to the CPU 14a. In this case, there is a case that the operator is aware of an erroneous insertion of the document after the document transfer is detected and pulls out the document in a flurry. In such a case, the document leading and trailing end detecting circuit 42 can not discriminate the pull-out of the document from the detection of the hole of the document. To obtain such a discrimination, once the document is detected, the document transfer control circuit 52 produces a document standby signal. Then, when the CPU 14a produces a start signal, the timer 124 in the document leading and trailing end detecting circuit 42 starts the time count. After the set time of the timer 124, the flip-flop 122 is set and the signal VDOC is "1" in level. When the signal VDOC is "1", the address counter of the page buffer 12a is sequentially counted up by the horizontal synchronizing signal SCP, so that the picture element information are loaded into the page buffer 12a, through the picture information bus transceiver 48. At this time, since the document has been pulled out, and therefore only the black information are stored therein. So long as the signal VDOC is at "0" level, the inverted output signal from the flip-flop 122 causes the timers 128 and 136 to be in a reset state. Accordingly, even when the document detecting signal is in a state that no document is detected, i.e. in a "0" level, neither the timer 128 nor 136 counts time. When the signal VDOC is at "1" level and the document presence detecting signal is at "0" level, the timer 128 starts the time count. After the set times of the timers 128 and 136, and the time of 8 scannings, the output of the AND gate 146 becomes "1" level and the output of the flip-flop 122 is reset and the picture bus control circuit 44 stops the outputting of the picture element information from the picture bus transceiver 48.

Accordingly, during the set times of the timers 128 and 136 and the scanning period of 8 scannings, the address counter not shown of the page buffer 12a is counted up and only the black information are stored in the page buffer. After the writing operation into the page buffer 12a is finished, the CPU 14a compares the count set in the main memory 14b with the count in the address counter in the page buffer 12a. When the latter is smaller than the former, an error is displayed by the display device 18a to inform the operator of it. The count previously stored in the main memory 14b is set to a transfer time corresponding to a length of the transferring minimum document in the transferring direction. A length of the transfer time to which the set times of the timers 128 and 136 are set, that is, a length from the document presence detector to the portion under scanning, is selected shorter than the minimum document length.

When the interval between the adjacent documents set by the operator is too short, the timer 128 is reset and the next document is deemed to be continued to the preceding document, so that the picture information are stored into the page buffer 12a. In this case, the count of the address counter in the page buffer 12a exceeds the maximum address of the page buffer previously stored in the main memory 14b. Accordingly, the CPU 14a displays this as an overflow error by the display device 18a.

Incidentally, in the present embodiment, the timer 128 forms a first counter circuit and the timer 136 forms a second counter circuit.

According to the picture information input apparatus thus constructed, a holed document, if the diameter of the hole is within an allowable range, the document can be read in as the picture information. Even when the hole diameter is beyond the allowable range, the transfer of the document is continued until the read of the document is completed to continuously produce the picture information, and after the transfer of that document is completed, the succeeding document is transferred. Therefore, the succeeding document is aligned by the rollers 24a to 24d, therefore ensuring an appropriate read-in of the picture information of the succeeding document.

Håving described a specific embodiment of our bearing, it is believed obvious that modification and variation of our invention is possible in the light of the above teachings.

What is claimed is:

1. A picture information input apparatus for reading information from an object comprising:
    transfer means for transferring an object to be read from an input position to a scanning position;
    optical scanning means for scanning said object at said scanning position with radiation, and producing a synchronizing signal in synchronism with said scanning;
    optical converting means for converting radiation reflected from said object into an analog information signal;
    binary coding means for coding said analog signal from said optical converting means into white and black picture information;
    detection means for generating an object present signal indicative of the presence or absence of said object;
    leading and trailing edge detecting means for detecting the leading and trailing edges of said object and providing an edge read out signal indicative thereof, said edge detecting means comprising:
    (a) first counter means for carrying out a specified count of said white information in a scanning direction of said object;

(b) first timer means for measuring a time from when said object is at said initial position to when a scanned portion thereof is reached;

(c) second counter means for measuring the duration of an object presence signal indicating the absence of an object the maximum time of said second counter means corresponding to a predetermined maximum permitted hole diameter of the object;

(d) third counter means, having a "set" input coupled to an output of said second counter means, for determining a time difference between a time measured by said second counter means and the transfer time between the presence/absence detection of the objeft and the arrival of said object at said scanning section; and (e) latch means for receiving either a signal from said first counter means or a signal from said first timer means as a leading edge detection signal, and receiving a signal from said third counter means as the leading edge detection means;

drive means for driving said transfer means in accordance with said object present signal from said detecting means and the read out signal from said leading and trailing edge detecting means; and picture data transmitting means for transmitting binary picture information from said binary coding means in accordance with said synchronizing signal from said optical scanning means from when said leading edge detection signal is latched by said latch means to when said trailing edge detection signal is latched by said latching means.

2. A picture information input apparatus according to claim 1, wherein said leading and traling edge detecting means further comprises a first register means for storing a specified scan line portion of white information counted by said first counter means, and second register means for storing a specified scan line portion of said white information counted by said first counter means based on the timing of the output signal from said third counter means.

3. The picture information input apparatus according to claim 1, wherein said optical scanning means comprises: a laser generator for generating laser beams in two directions; an optical scanner which forms an optical scanning beam by continuously reflecting one of said two directional laser beams at one surface of a mirror, and for forming a synchronizing beam by continuously reflecting the other laser beam by the other surface of said mirror; a first synchronizing signal generator which receives said synchronizing laser beam from said optical scanner to transmit a signal every scanning by the laser beam; a converter which is irradiated with the synchronizing beam from said optical scanner, and converts the beam into an ON-OFF beam; a second synchronizing signal generator which receives the ON-OFF beams from said converter to produce a synchronizing signal with the number of pulses corresponding to the ON's and OFF's of said ON-OFF beam; and a third synchronizing signal generator for transmitting signals from said second synchronizing signal generator masked for a given period of time as synchronizing signals in accordance with signals transmitted from said first and second synchronizing signal generators.

4. The picture information input apparatus according to claim 3, wherein said third synchronizing signal generator comprises: a first counter which has a given value set by the signal from said first synchronizing signal generator, executes the counting by the signals from said second synchronizing signal generator, and produces a signal when the count reaches said given value; and a second counter which has a given value previously set, executes the counting operation in response to the presence of at least the signals from said counter and the signals from said second synchronizing signal generator, transmits the signals from said second synchronizing signal generator as new synchronizing signals during the counting operation, and stops the counting operation and the transmitting of the signal when the count thereof reaches said given value.

* * * * *